United States Patent [19]

Andersen

[11] Patent Number: 4,895,197
[45] Date of Patent: Jan. 23, 1990

[54] METHOD AND APPARATUS FOR SAWING LOGS

[76] Inventor: Erling J. Andersen, New Denmark N.B., New Denmark, New Brunswick, Canada, E0J 1T0

[21] Appl. No.: 201,864

[22] Filed: Jun. 3, 1988

[30] Foreign Application Priority Data

Jun. 12, 1987 [CA] Canada .................................. 539578

[51] Int. Cl.⁴ ............................ B27L 7/00; B27C 9/00
[52] U.S. Cl. ........................................ 144/369; 83/36; 83/708; 83/862; 144/3 R; 144/39; 144/370; 144/378; 269/63
[58] Field of Search ................. 144/3 R, 39, 41, 369, 144/370, 376, 377, 378; 83/36, 704, 707, 708, 862; 269/63

[56] References Cited

U.S. PATENT DOCUMENTS

| | | | |
|---|---|---|---|
| 555,037 | 2/1896 | Dees | 144/378 |
| 3,304,971 | 2/1967 | Pease . | |
| 3,452,793 | 1/1969 | Wexell . | |
| 3,457,978 | 7/1969 | Ahlstedt | 144/370 |
| 3,786,712 | 1/1974 | Mackin | 83/708 |
| 4,015,648 | 4/1977 | Shepard | 144/39 |
| 4,068,695 | 1/1978 | Seaman . | |
| 4,327,789 | 5/1982 | Reuter | 144/39 |
| 4,335,767 | 6/1982 | Reuter | 144/39 |
| 4,538,656 | 9/1985 | Wiklund | 144/378 |
| 4,711,279 | 12/1987 | Reuter | 144/378 |

*Primary Examiner*—W. Donald Bray
*Attorney, Agent, or Firm*—McFadden, Fincham Marcus & Allen

[57] ABSTRACT

A log (10) to be sawn into boards is supported by a support assembly (26) which supports the log with its longitudinal axis aligned with the direction of carriage movement of a carriage (22) reciprocating along a defined pathway. A side trimming head (12) is mounted adjacent the path followed by the log and includes first (94) and second (96) spaced-apart circular saw blades oriented so as to make two blind cuts to a predetermined depth into a supported log. An intermediate rotary cutter (104) may be provided between the blades to shape the portion of the log between the first and second blades. A third circular saw blade (14; 107), oriented transversely to the first two blades, cuts the completed board from the log.

26 Claims, 6 Drawing Sheets

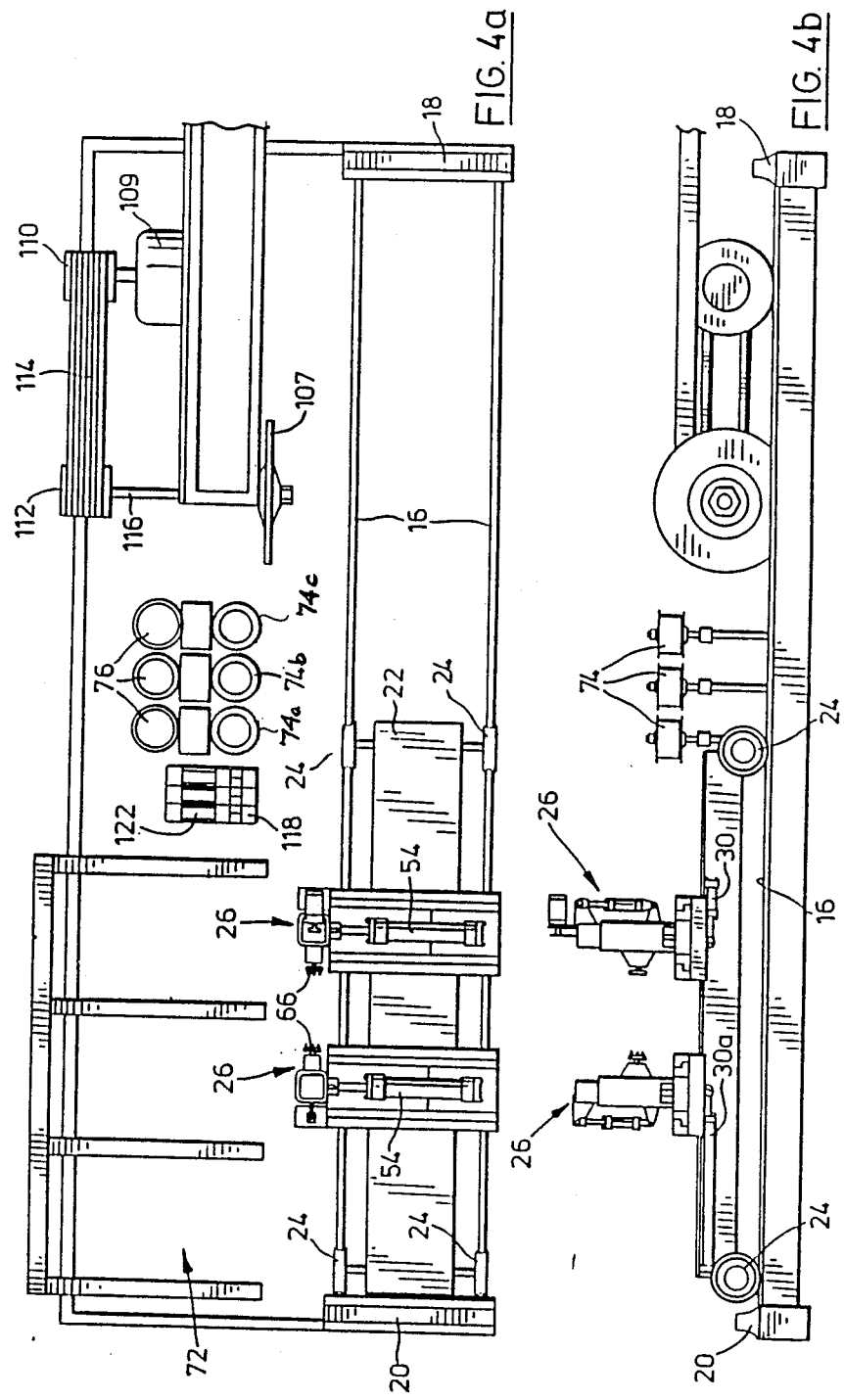

4,895,197

METHOD AND APPARATUS FOR SAWING LOGS

FIELD OF INVENTION

This invention relates generally to a method and apparatus for sawing logs into individual boards, pickets, and the like.

DESCRIPTION OF THE RELEVANT ART

In the breakdown of hardwood or softwood logs into lumber, the emphasis currently is on a high production rate and not on maximizing the recovery of material from the logs. Because of the demand and value of the final product, and the additional work required to recover the material, most mills don't attempt to recover anything less than 3 inches in width and 8 feet in length. In addition, most mills do not shorten the logs but saw them as they are received, since demand is for the longer lengths. This results in a reduced recovery from logs with irregular shapes (crooks, sweeps, exaggerated tapers, etc.). Currently, small dimensional hardwood stock such as is used for furniture is obtained by resawing lumber produced in this manner.

The present invention is applicable to the production of small dimensional stock, and emphasizes maximum recovery from the log rather than a high production rate.

SUMMARY OF THE INVENTION

According to one aspect of the present invention, apparatus for sawing logs into boards or the like comprises:

means for supporting said log;

a trimming head mounted laterally of the longitudinal axis of said log;

said supporting means and said trimming head being disposed for movement one relative to the other in the direction of the longitudinal axis of said log;

the trimming head including first and second spaced-apart saw blades coaxially mounted and oriented so as to make two longitudinal blind cuts to a predetermined depth into said log during said relative movement;

a third saw blade oriented so as to provide a third longitudinal cut extending transversely to, and communicating with, said two blind cuts;

and means operable on completion of the cuts by said first, second and third saw blades, respectively, for rotating said log about its longitudinal axis to position a different portion of the circumference of the log between said first and second saw blades.

Generally, the invention can be viewed as employing circumferential sawing, and this is expected to increase the quantity of quality material produced.

Because the desired end products are small, i.e. 1 to 3 inches in width and 14 to 72 inches in length, the tree can be divided up to obtain a quality feed stock, i.e. straight sections with a minimum taper. Based on this approach, a potential increase in recovery by 50 to 100 percent might be realized, as compared with the methods currently employed.

More particularly, this aspect of the invention may comprise apparatus for sawing a log into boards and the like, comprising:

a carriage and means defining a pathway along which the carriage is adapted to reciprocate, support means on the carriage for supporting a log with its longitudinal axis generally aligned with the direction of carriage movement, the support means being adapted selectively to rotate the log about its axis, a side trimming head mounted adjacent the path followed by a supported log when the carriage moves along said pathway, the side trimming head including first and second spaced-apart circular saw blades coaxially mounted and oriented so as to make two blind cuts to a predetermined depth into a supported log as it moves along said path, an intermediate rotary cutter between said saw blades, the intermediate rotary cutter being adapted to shape the portion of the log between the first and second saw blades so as to produce one face of the board to be removed from the log, and means for rotating said saw blades and rotary cutter, and a third circular saw blade oriented substantially at right angles to the aforementioned circular saw blades, but longitudinally separated therefrom in the direction of carriage movement, and means for rotating said third saw blade.

According to a second aspect of the present invention, a method of sawing logs into boards, or the like, comprises the steps of:

(a) supporting the log conveniently, by means of a carriage, adjacent a trimming head having first and second spaced-apart saw blades;

(b) effecting relative movement of the log and the trimming head in the direction of the longitudinal axis of the log, such that said first and second saw blades make two blind parallel cuts into the log at spaced apart locations; and (c) making a third longitudinal cut into said log extending transversely to, and communicating with, the two blind cuts so as to permit removal of the board between the cuts.

The method may further comprise the step of shaping the log exterior between the blind cuts to define one face of the board.

The third cut may be at right-angles to the two blind cuts.

DESCRIPTION OF THE DRAWINGS

One embodiment of this invention will now be described by way of example only and with reference to the accompanying drawings, in which like numerals denote like parts throughout the several views, and in which:

FIGS. 4a and 4b are plan and elevational 25 views, respectively, of the overall apparatus of this invention;

DETAILED DESCRIPTION OF THE INVENTION

Figure 1:
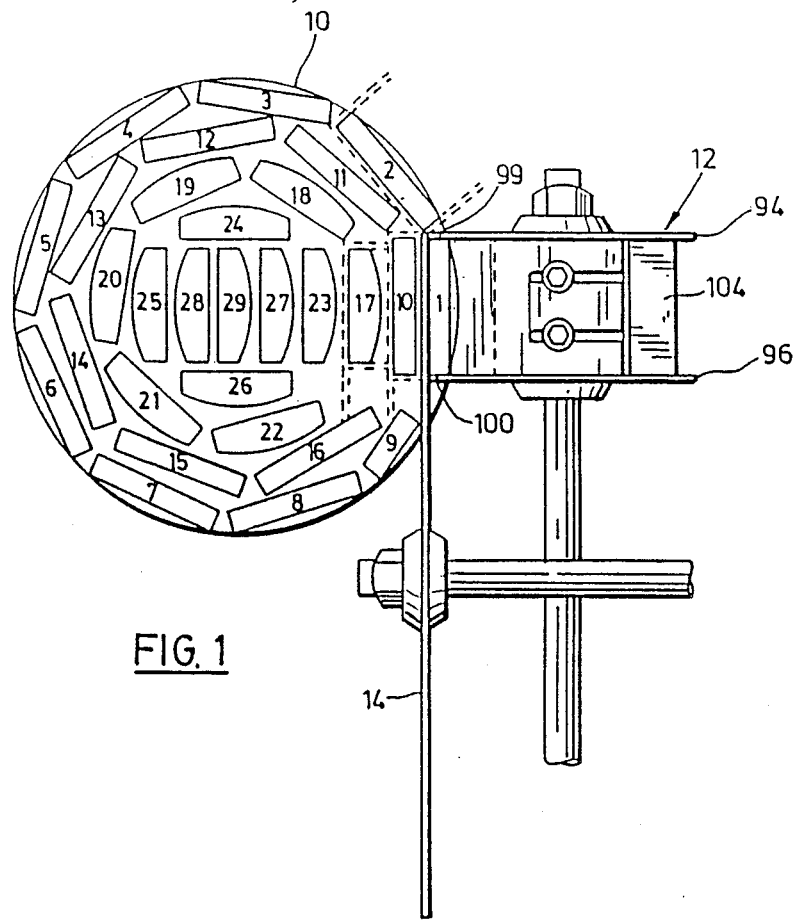
FIG. 1 is a cross-sectional view through a log, showing typical profiles of various boards, etc. taken from the log, as well as one of the principal components of the apparatus of this invention.

Attention is first directed to FIG. 1, which shows the cross-section of a log 10 on which has been drawn the sectional profiles of 29 individual boards which can be cut from the log, the boards being numbered in ascending order to show the sequence in which they The boards include 1 piece measuring 0.5"×1.5", 15 pieces measuring 0.5"×3", and 13 pickets having an outwardly convex rounded surface.

FIG. 1 also shows a side trimming head 12 which is mounted laterally adjacent the log. The side trimming head is intended to make two blind cuts to define the edges of a board to be removed from the log, and also shapes the portion of the log between the two blind cuts so as to produce one face of the board, namely the outermost face with respect to the axis of the log.

A circular saw blade 14 constitutes the main blade and is oriented substantially at right angles to the blind cuts made by the side trimming head 12.

To allow an understanding of the relative motions and positions of the components shown in FIG. 1, reference may be had to FIGS. 4a and 4b, showing the overall arrangement of the main components of the saw mil #. In FIGS. 4a and 4b, a horizontal track is provided consisting of two rails 16 which are parallel and spaced apart. Stop means 18 and 20 are provided at either end of the track. A carriage 22 has four wheels 24 riding on the rails 16, and can move in a reciprocating motion between the stop means 18 and 20.

Figure 5B:
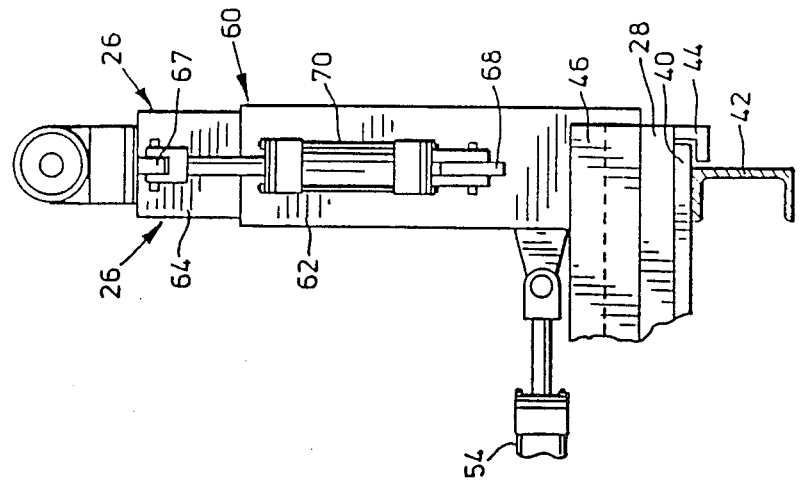
FIGS. 5a and 5b are front and side partial elevational views of a log support for engaging one end of a log, forming part of the apparatus of this invention.
Figure 5A:
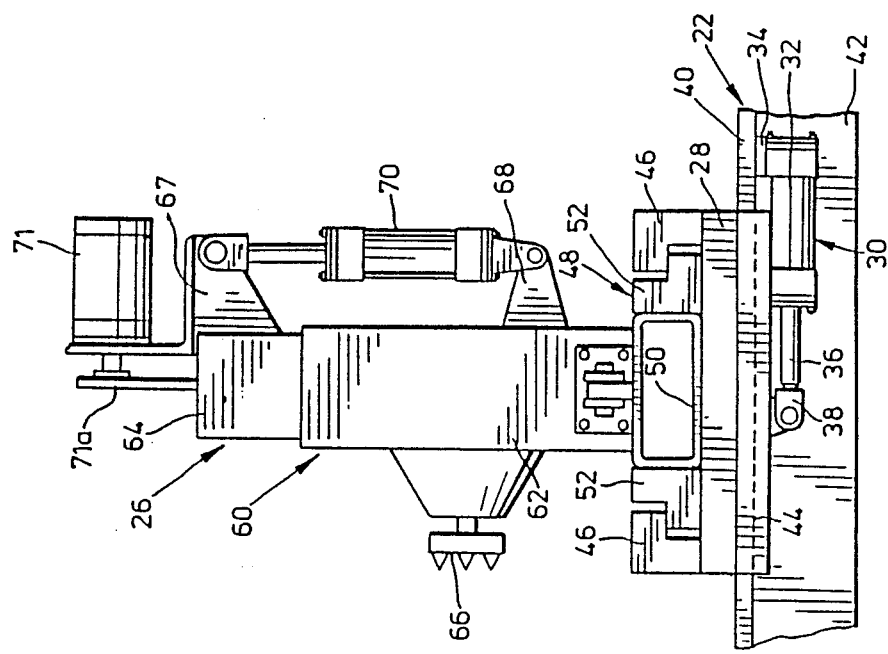

Mounted on the carriage 22 are two support assemblies shown generally at 26. One support assembly is shown in greater detail in FIGS. 5a and 5b. Each support assembly 26 includes a base member 28 which is slidably mounted longitudinally of the carriage 22, the position of the base member 28 being determined by a hydraulic actuator 30 having a cylinder 32 secured at 34 to the carriage 22, and having its piston 36 secured at 38 to the underside of the base member 28. In FIG. 5b, the carriage 22 can be seen to consist of a top plate 40 secured above two parallel channel members 42. As can also be seen in FIG. 5, the base member 28 includes a downwardly and inwardly extending flange 44 to allow the base member 28 to slide in parallel relation to the plate 40. Secured to and extending upwardly from the base member 28 are two L-shaped guides 46, between which moves a slide assembly 48 which includes a rectangular arm 50 secured to two further L-shaped members 52. The assembly 48 is moved with respect to the base member 28 by the hydraulic actuator 54. Secured to the arm 50 is an upstanding telescoping assembly 60 including a first member 62 which is welded or otherwise fixedly secured with respect to the arm 50, and a vertically reciprocating second member 64 which carries a center support 66 on a first bracket projecting through a vertical slot in the member 62, and a second bracket 67. The movable member 64 is moved up and down by virtue of a hydraulic actuator 70 connected between the bracket 67 on the member 64 and a fixed bracket 68 on the member 62.

As can be seen in FIG. 4a, the two center supports 66 face each other, and can be moved toward and away from each other by the hydraulic actuators 30 and 30a (FIG. 4b). The center supports 66 are rotated hydraulic motor 71 through a chain drive 71a.

It will thus be appreciated that the center supports 66 can each be moved independently in three mutually perpendicular directions with respect to the carriage 22, whereby a log can be gripped between the center supports, and further can be aligned so that its center axis is parallel to the direction of movement of the carriage 22.

FIG. 4a shows a loading deck generally at 72, which is adapted to receive logs that can be picked up individually between the center supports 66.

Figure 3C:
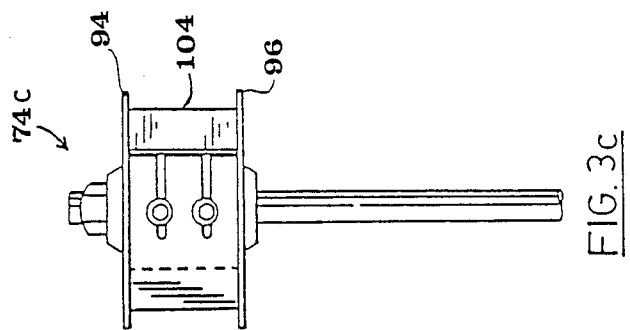
FIGS. 3a, 3b and 3c are elevational views of three variations of one of the components of this invention.
Figure 3B:
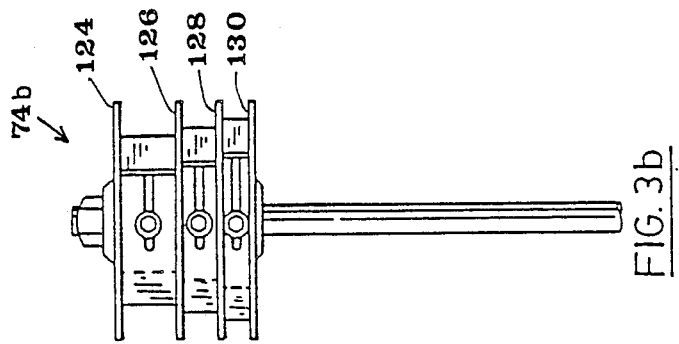
Figure 3A:
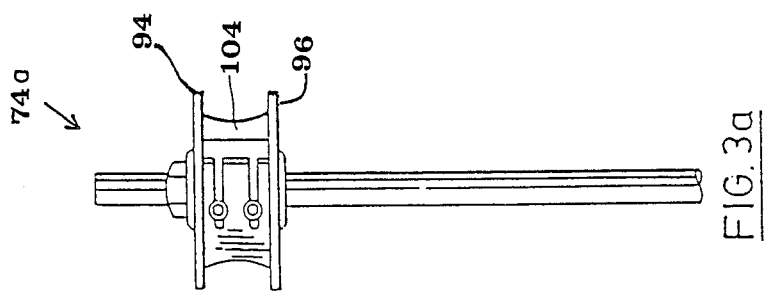
Figure 7:
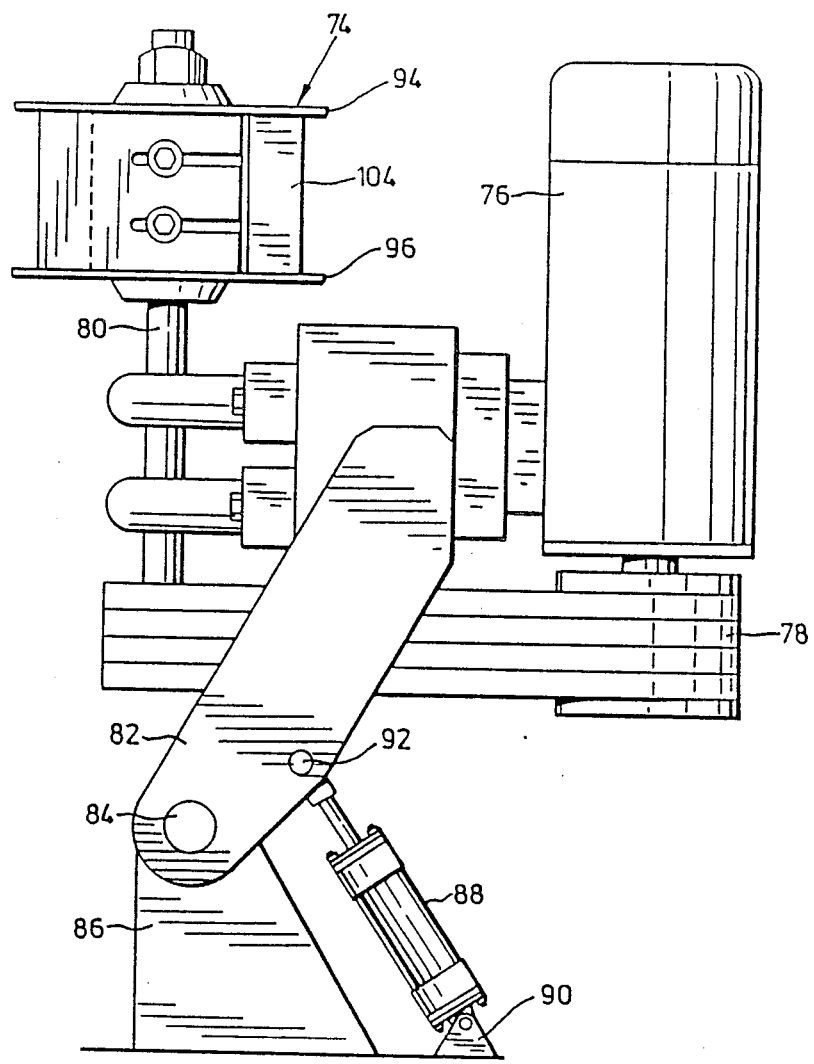
FIG. 7 is an elevational view of a side trimming head, showing the mechanism for retracting the head when not in use.

Still referring to FIG. 4a, the general assembly includes three side trimming heads 74a, 74b and 74c (shown individually in FIGS. 3a, 3b and 3c, respectively). The heads 74a, 74b and 74c are shown in FIG. 4 longitudinally aligned in the direction of movement of the carriage 22, but positioned laterally beside the carriage. Each head 74 corresponds to the side trimming head 12 seen in FIG. 1. Each head is mounted for rotation about a vertical axis, and is powered by its own electric motor 76. As seen in FIG. 7, a multi-belt drive 78 transmits power between the motor 76 and the shaft 80 of the respective side trimming head. The entire assembly is mounted on a pair of swing arms 82 which are mounted for pivoting movement about an axis 84 on a bracket 86 fixedly mounted to the ground. The swing arms 82 can be pivoted by the use of a hydraulic actuator 88 connected between a bracket 90 and a location 92 on the swing arms 82. This allows each side trimming head to be retracted out of interfering relation with a log, when that particular head is not in use. Looking specifically at FIGS. 1 and 7, the side trimming head 74 includes (in the embodiment shown) first and second spaced-apart circular saw blades 94, 96 which are coaxially mounted and oriented so as to be able to make two blind cuts to a predetermined depth into a log supported between the center supports 66, as the carriage 22 moves in the rightward direction as pictured in FIG. 4a, thus carrying the log along a predetermined path. This is best seen in FIG. 1, where the blades 94 and 96 are seen to be making two blind cuts 99 and 100 into the log 10.

Each side trimming head 74 further includes an intermediate rotary cutter 104 between the saw blades 94 and 96, the intermediate rotary cutter 104 being adapted to shape the portion of the log between the first and second saw blades so as to produce one face of the board to be removed from the log. In the examples shown in FIGS. 1 and 7, the intermediate rotary cutter has a substantially cylindrical shape, whereby it produces a flat surface on the board to be removed from the log. By contrast, the intermediate rotary cutter 104a shown in FIG. 3a has a concave surface, whereby to produce a convex face on the board to be removed from the log.

Returning now to FIGS. 4a and 4b, there is provided, downstream (to the right) of the side trimming heads 76 a further circular saw blade (the main blade) 107 oriented substantially at right angles to the previously mentioned circular saw blades 94 and 96 of the side trimming heads. The saw blade 107 in FIG. 4a is essentially the same as the saw blade identified by the numeral 14 in FIG. 1.

The saw blade 107 is rotated by a motor 109 through sheaves 110 and 112 and plural belts 114. The saw blade 107 is mounted on a shaft 116. It will be noted, particularly in FIG. 1, that the main saw blade 14 (107) is adapted to cut only to the location of the blind cut made by the top circular saw blade 94 of the side trimming head 12. This results in a notch being taken out of the log 10, shaped as shown at 118 in FIG. 6.

Figure 6:
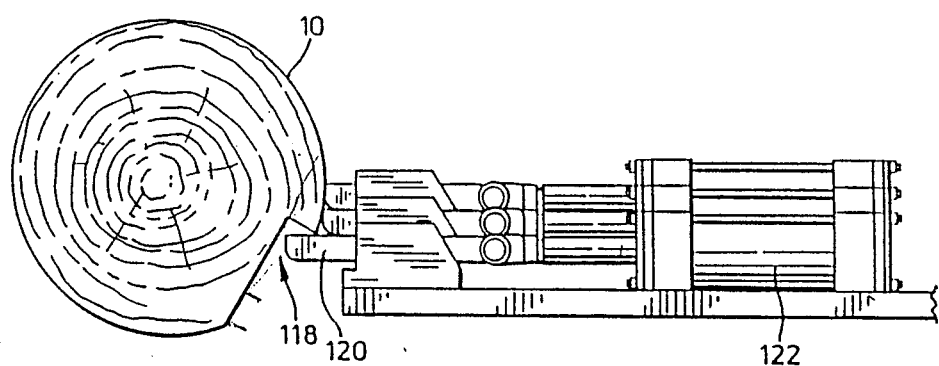
FIG. 6 is a somewhat schematic view showing an angular positioner forming part of the apparatus of this invention.
Figure 2:
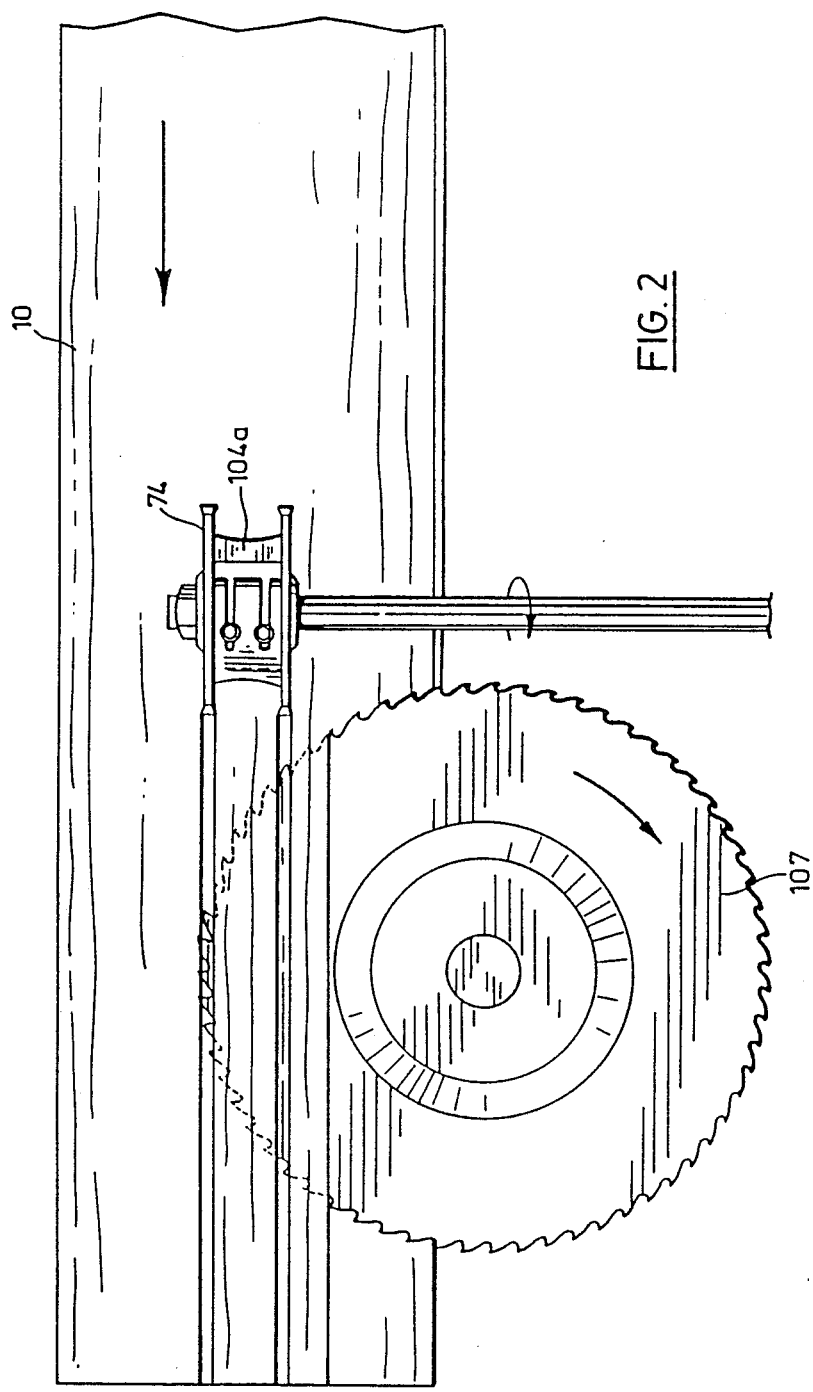
FIG. 2 is an elevational view of a log in the cutting process, showing two principal components of the apparatus.

After the first board has been removed from the log 10, leaving the notch 118, the support 66 which is controllable by the motor 71 through a chain drive 71a is rotated while at the same time a detent 120 (see FIG. 6) is urged against the log and into the notch 118 by a respective hydraulic actuator 122. The detent 120 and its corresponding hydraulic actuator 122 are one set of three such detent arrangements which are such as to establish slightly different angular positions for the log 10. It will be realized that the log 10 comes to a halt when the notch 118 abuts against the detent 120, as seen in FIG. 6. This then determines the angular position of the log for the next cut. When the log 10 has been moved to its new position, the chain drive 71a is locked (by means not shown) against further movement, so that the log 10 will remain in the position it has taken up, even when it is out of contact with the respective detent 120.

In operation, the first step is to pick up a log 10 from the loading deck 72 by grasping it between the center supports 66. In order to do this, the various hydraulic actuators 30, 30a, 54 and 70 are utilized. These are manually controlled from a central control panel (not illustrated) by a suitably trained operator.

Once the log has been secured and grasped between the center supports 66, the hydraulic motor 71 is locked in place by conventional means (not shown), and drive means which have not been illustrated cause the carriage 22 to begin moving to the right as pictured in FIG. 4a. The detent 120, etc. are withdrawn from contact with the log for the first run, since it does not matter where the first cut is taken around the circumference of the log. Prior to beginning the run, the particular desired side trimming head 74c would be selected, and the other two heads 74a, 74b would be retracted out of operative relation with the log by utilizing the respective hydraulic actuators 88 (see FIG. 7).

As the run is being made, the side trimming head which has been selected is rotating under power, and also the main circular saw blade (14) 107 is being rotated by the motor 109. The blind cuts 99 and 100 are made by the saw blades 94 and 96 of the side trimming head, while the main saw blade (14) 107 makes a cut which substantially just touches the upper blind cut 99, thus leaving the notch 118 (FIG. 6) in the log 10. The carriage runs the full length of the track, which results in the board being completely severed from the log.

The carriage is then retracted to its original position (that shown in FIG. 4a), while the log remains in the original position rotationally. Then, the selected detent 120, etc. is urged against the log surface by the respective hydraulic actuator 122 with the carriage 22 stationary. At the same time, the motor 71 rotates the center support 66 and the log through the chain drive 71a (after the locking has been removed), the rotation being in the clockwise sense as pictured in FIG. 6. This continues until there is mechanical interference between the notch 118 and the selected detent 120. Once this mechanical interference has taken place, the chain drive 71a is again locked in order to maintain the log in the angular orientation that it has now taken up. Then, the detent 120 is withdrawn, and the carriage 22 makes another run, resulting in board No. 2 (see FIG. 1) being removed.

This procedure continues until all of boards 1–8 have been removed. At this point, there is only room enough for a narrower board (No. 9) to be removed, and this can be done by utilizing a different side trimming head 74b, namely that shown in FIG. 3b. As seen in the figure, there are four circular cutting blades 124, 126, 128 and 130 in the side trimming head of FIG. 3b, each adjacent pair having a different spacing, and each having a different depth of board that it will cut. A special trimming head such as that shown in FIG. 3b could be utilized to cut the narrower board seen in FIG. 1. Prior to this particular run, the new side trimming head 74b would be moved forward into position, and the original side trimming head 74c would be retracted.

Following the cutting of board 9, additional boards 10–16 would be cut with the original side trimming head 74c in a new series of operations as described previously. From then on, utilizing the layout shown in FIG. 1, boards 17–29 would be cut utilizing a side trimming head somewhat like that shown in FIG. 3a, these boards being pickets with an outwardly-facing convex surface.

While one embodiment of this invention has been illustrated in the accompanying drawings and described hereinabove, it will be evident to those skilled in the art that changes and modifications may be made therein without departing from the essence of this invention, as set forth in the appended claims.

For example, the cutter means 104 need not be between the two saw blades of the trimming head but could be spaced therefrom in the direction of longitudinal axis of the log. Moreover, the cutter means might be a saw blade, mounted alongside the main blade, instead of the rotating cutter 104.

I claim:

1. Apparatus for sawing logs comprising:
   support means for supporting said log;
   a trimming head mounted laterally of the longitudinal axis of said log;
   said support means and said trimming head being disposed for movement one relative to the other in the direction of the longitudinal axis of said log;
   the trimming head including first and second spaced-apart saw blades coaxially mounted and oriented so as to make two longitudinal blind cuts to a predetermined depth into said log during said relative movement;
   a third saw blade oriented so as to provide a third longitudinal cut extending transversely to, and communicating with, said two blind cuts; and
   means operable on completion of the cuts by said first, second and third saw blades, respectively, for rotating said log about its longitudinal axis to position a different portion of the circumference of the log between said first and second saw blades.

2. Apparatus as claimed in claim 1, having cutter means for shaping that portion of the log which passes between said first and second saw blades so as to produce one face of a board to be removed from the log.

3. Apparatus as claimed in claim 2, wherein said cutter means is located between said first and second saw blades, respectively.

4. Apparatus as claimed in claim 2, wherein said cutter means is a rotary cutter.

5. Apparatus as claimed in claim 2, wherein said cutter means is adapted to impart a non-planar shape to said one face of said board.

6. Apparatus as claimed in claim 1 or 5, wherein said third saw blade is circular.

7. Apparatus as claimed in claim 1, wherein said third saw blade extends substantially at right angles to said first and second saw blades, respectively.

8. Apparatus as claimed in claim 1, including angular positioning means for setting the orientation of a supported log for each cutting operation.

9. Apparatus as claimed in claim 8, wherein said angular positioning means includes at least one movable detent adapted to be positioned so as to mechanically interfere with rotation of the log by abutting one of said two blind cuts made in a previous cutting operation, and means for selectively moving said at least one detent.

10. Apparatus as claimed in claim 9, wherein said angular positioning means comprises a plurality of movable detents, each being adapted to arrest rotation of the log at a different angular position thereof.

11. Apparatus as claimed in claim 8, wherein said carriage is adapted selectively to position the log to any location within a range of vertical heights and a range of positions in the horizontal direction normal to the log axis.

12. Apparatus as claimed in claim 2, wherein said cutter means is adapted to produce a flat face on the board.

13. Apparatus as claimed in claim 2, wherein said cutter means is adapted to produce an outwardly convex face on the board.

14. Apparatus as claimed in claim 2, wherein the trimming head includes a plurality greater than two of circular saw blades all coaxially mounted, whereby to cut a plurality of boards simultaneously from a supported log.

15. Apparatus as defined in claim 14, wherein cutter means are provided between each pair of said plurality of saw blades, for shaping that portion of the log which passes between such pair of blades so as to form one face of the board to be removed from the log.

16. Apparatus as claimed in claim 1, wherein the trimming head includes selectively powdered means by which it can be withdrawn from the path of a supported log.

17. Apparatus as claimed in claim 1, having means defining a pathway along which the carriage is adapted to reciprocate to effect said relative movement of said carriage and said trimming head, said support means being adapted for supporting said log with its longitudinal axis generally aligned with the direction of carriage movement.

18. Apparatus as claimed in claim 1, wherein said rotating means is mounted on said support means (26).

19. A method of sawing a log comprising the steps
 (a) supporting the log adjacent a trimming head having first and second spaced-apart saw blades;
 (b) effecting relative movement of the log and the trimming head in the direction of the longitudinal axis of the log, such that said first and second saw blades make two blind parallel cuts into the log at spaced apart locations, and
 (c) making a third longitudinal cut into said log extending transversely to, and communicating with, the two blind cuts so as to permit removal of a board between the cuts; and
 (d) on completion of the blind cuts and third longitudinal cuts, rotating said log about its longitudinal axis to position a different portion of the circumference of the log between the first and second saw blades.

20. A method as claimed in claim 19, wherein more than two saw blades are employed to make at least three parallel blind cuts into said log, so as to produce two boards therebetween.

21. A method as claimed in claim 19, including the step of shaping the log between the or each pair of blind cuts to form the outwardly-facing face of the board.

22. A method as claimed in claim 21, wherein said shaping imparts a convex shape to said face.

23. A method as claimed in claim 21, wherein the blind cuts and shaping cut are accomplished simultaneously.

24. A method as claimed in claim 19, wherein a further board is cut from the log by the further steps of:
 restoring the relative positioning of the log and trimming head prior to said relative movement, and repeating steps (b) and (c).

25. A method as claimed in claim 19, wherein the third longitudinal cut terminates substantially at one of the blind cuts, leaving a longitudinal ridge adjacent said one of the blind cuts.

26. A method as claimed in claim 24, wherein the third longitudinal cut terminates substantially at one of the blind cuts, leaving a longitudinal ridge adjacent said one of the blind cuts, and said rotation of said log is arrested by abutting a detent means against said ridge.

* * * * *